(No Model.)
B. BEAUPRE.
ANTI-FRICTION BEARING ROLLER JOURNAL.
No. 427,539. Patented May 13, 1890.
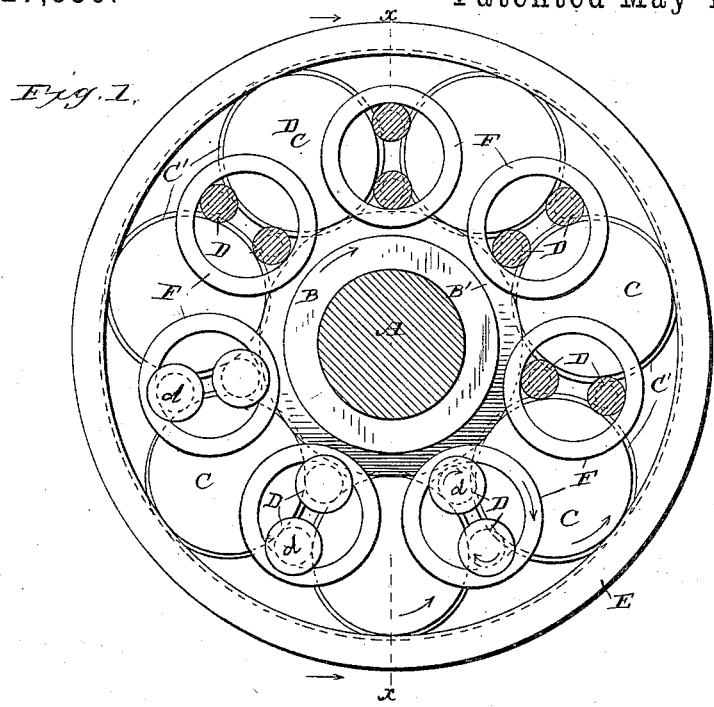
Fig. 1.
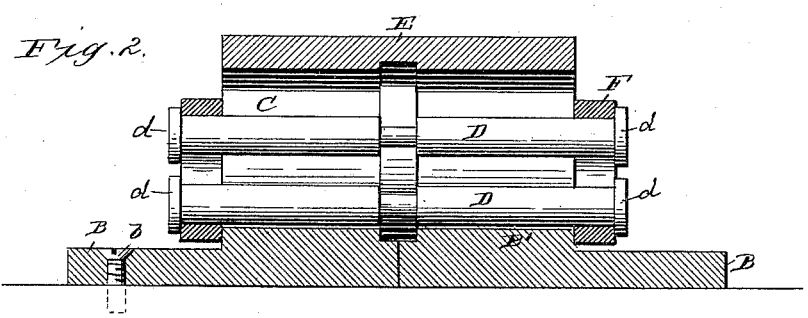
Fig. 2.
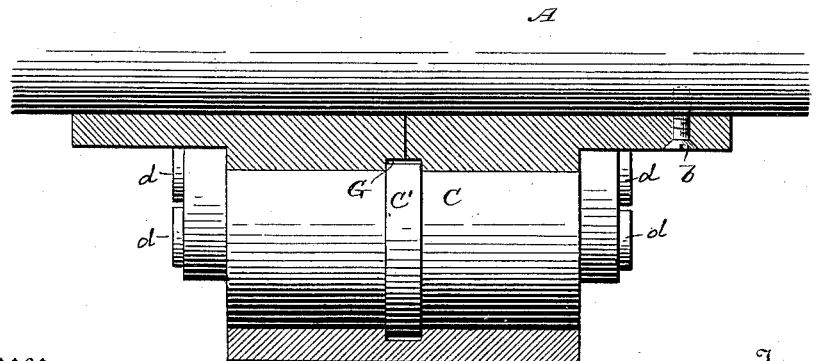
Witnesses
Inventor
Bruno Beaupre
By his Attorneys

UNITED STATES PATENT OFFICE.

BRUNO BEAUPRE, OF ST. PAUL, MINNESOTA.

ANTI-FRICTION BEARING-ROLLER JOURNAL.

SPECIFICATION forming part of Letters Patent No. 427,539, dated May 13, 1890.

Application filed October 21, 1889. Serial No. 327,691. (No model.)

*To all whom it may concern:*

Be it known that I, BRUNO BEAUPRE, of St. Paul, in the county of Ramsey and State of Minnesota, have invented certain new and useful Improvements in Anti-Friction Bearings; and I do hereby declare the following to be a full, clear, and exact description of the same, reference being had to the accompanying drawings, forming a part of this specification, and to the letters of reference marked thereon.

This invention relates to improvements in that class of anti-friction bearings wherein the shaft is supported and caused to rotate in contact with traveling rollers; and it consists in certain novel and improved combinations and arrangements of parts, as hereinafter fully described, and pointed out in the claims.

Referring to the accompanying drawings, Figure 1 is an end elevation of a bearing constructed in accordance with my invention with the casing removed and the caps of some of the separating-rollers broken away. Fig. 2 is a section on line $x\ x$, Fig. 1.

Like letters of reference indicate the same parts in both figures.

Upon the shaft A are sleeves B B', formed in two pieces to enable them to be placed in proper position, and which sleeves are fastened rigidly to the shaft by set-screws $b$ or otherwise and constitute the journal proper. Surrounding the sleeves or journal are a series of bearing-rollers C, which travel in contact with the journal and between the latter and the inner cylindrical surface of the box E, surrounding the journal. The rollers C are not provided with journals, and are retained in position and prevented from longitudinal movement by means of the shoulders or collars C' formed thereon and entering the grooves G, formed in the sleeves B B', separating-rollers D, and inner surface of the box.

Between the adjacent bearing-rollers C are arranged two separating-rollers D D, one on each side of a line drawn from center to center of adjacent rollers, and each being of such size as to prevent their crossing such line or approaching the same near enough to touch the other. Each pair of separating-rollers between the adjacent bearing-rollers is held in position and out of contact with the journal A or box E by rings F, surrounding and supported by the ends of each pair. Said rings revolve around the ends of the separating-rollers without any friction whatever, and are retained in place by the end caps $d$ on the rollers. The bearing may be inclosed by a cover similar to that described in my prior application, Serial No. 325,533, filed September 30, 1889, in order to prevent dust from getting inside.

Separating-rollers D, it will be seen, are supported wholly by the bearing-rollers, and all contacting-surfaces throughout the bearing move in the same direction and at the same speed, thus forming a bearing absolutely without friction, and that, too, without the necessity of such nice relative proportioning of the contacting parts as has heretofore been found necessary.

It is obvious that changes in the various details of construction and arrangement of the parts may be made without departing from the spirit of my invention, and therefore I do not wish to be limited to the specific structure shown and described.

Having thus described my invention, what I claim as new is—

1. In a roller-bearing, the combination, with a series of bearing-rollers and two separating-rollers between adjacent bearing-rollers, of rings for retaining said separating-rollers in position, substantially as described.

2. In a roller-bearing, the combination, with a series of bearing-rollers and two separating-rollers between and located one on each side of a line drawn through the centers of adjacent bearing-rollers, of rings for retaining the separating-rollers in place, substantially as described.

3. In a roller-bearing, the combination, with a series of bearing-rollers and two separating-rollers between and located one on each side of a line drawn through the center of adjacent bearing-rollers, of independent rings surrounding each pair of separating-rollers, whereby they are retained in proper position between the bearing-rollers, substantially as described.

4. In a roller-bearing, the combination, with a series of bearing-rollers and two separating-rollers between and located one on each side of a line drawn through the centers of adjacent bearing-rollers, of independent rings encircling and supported by the ends of each pair of separating-rollers, whereby the parts are held in their proper relative positions and may rotate without friction at any point, substantially as and for the purpose set forth.

5. In a roller-bearing, the combination, with the shaft A, box E, and bearing-rollers C, of the separating-rollers D D, the rings F, surrounding the same, and the sleeves B B', formed in two parts and secured rigidly to the shaft, substantially as and for the purpose set forth.

In testimony whereof I have hereunto set my hand in presence of two subscribing witnesses.

BRUNO BEAUPRE.

Witnesses:
 WM. NEWTON,
 F. B. SMITH.